May 26, 1931. G. L. BINNS 1,807,371
LUGGAGE CARRIER FOR VEHICLES
Filed April 25, 1929
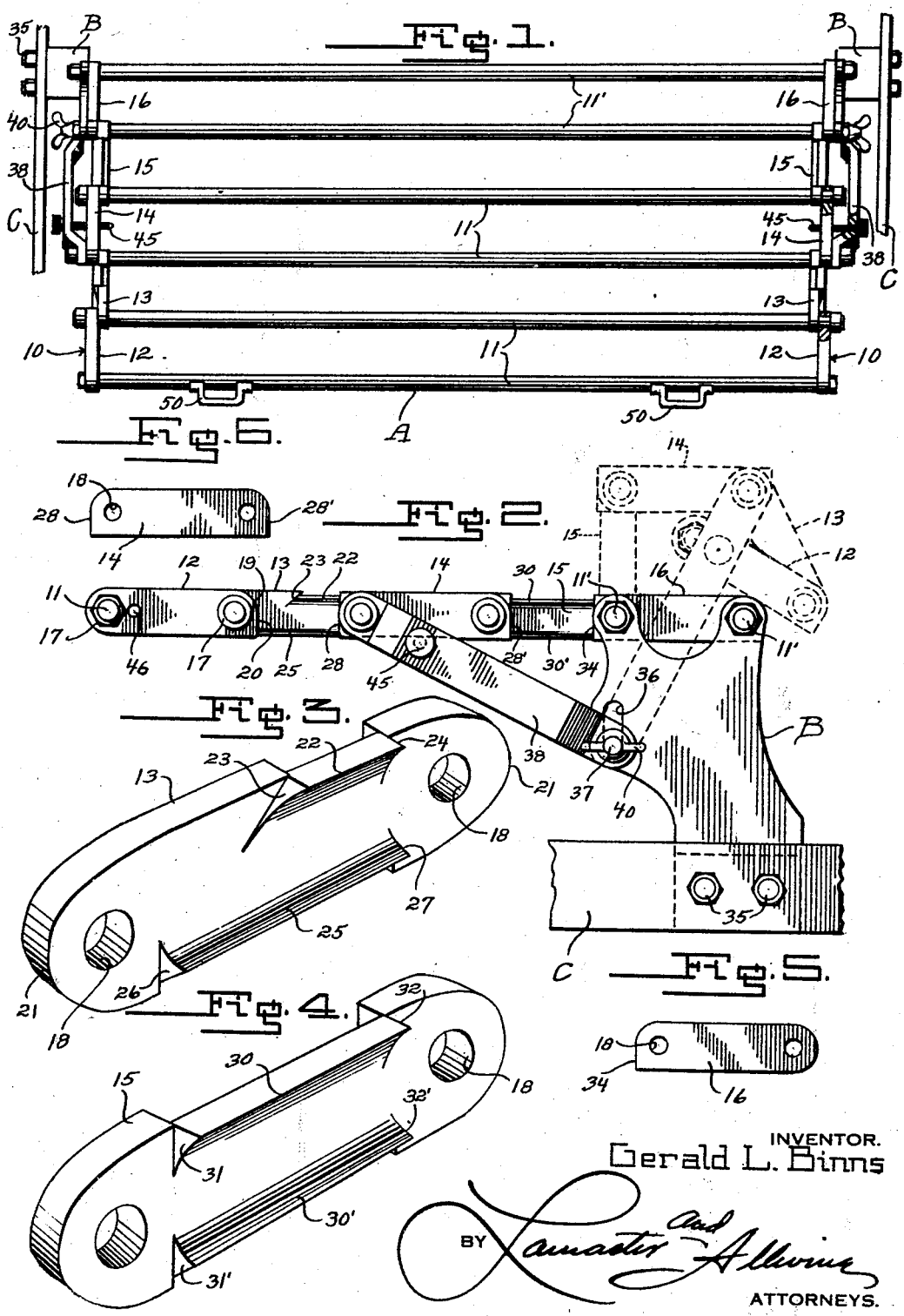
INVENTOR.
Gerald L. Binns
ATTORNEYS.

Patented May 26, 1931

1,807,371

UNITED STATES PATENT OFFICE

GERALD L. BINNS, OF YPSILANTI, MICHIGAN

LUGGAGE CARRIER FOR VEHICLES

Application filed April 25, 1929. Serial No. 358,065.

The present invention relates to luggage carriers for motor vehicles and the primary object of the invention is to provide a luggage carrier which may be attached to the rear of a vehicle without detracting from the appearance of the vehicle when the carrier is in its collapsed or inoperative condition.

A further object of the invention is to provide a carrier adapted to be rolled into a small neat compact form against the body of the vehicle so that the carrier when not in use does not hide but a very small portion of the vehicle body.

A further object of the invention is to provide a luggage carrier embodying a rack bed or frame adapted to be rolled into a compact form having relatively small height and width, with means for holding the frame in a rigid position when rolled up.

A further object of the invention is to provide a luggage carrier having a rack bed or frame intended to be rolled from a flat extended position into a compact form, with offsets so co-acting between the sections of the frame as to hold the frame in a flat rigid condition when open or extended, and also limiting the extent to which the frame may be rolled up.

A further object of the invention is to provide a luggage carrier which may be extended to various positions for receiving articles of various sizes.

Other objects and advantages of the invention will be apparent during the course of the following detailed description taken in connection with the accompanying drawings forming a part of this specification and in which drawings:

Figure 1 is a top plan view of the improved carrier shown in its extended position.

Figure 2 is an enlarged end elevation of the carrier shown extended ready for use, and by means of dotted lines the relative positions of the carrier sections when completely rolled up.

Figure 3 is an enlarged perspective view of the outer side of one of the link or hinge members for the end rails.

Figure 4 is a perspective view of the outer side of another link or hinge member for the end rails.

Figure 5 is a plan view of the innermost link of the end rails.

Figure 6 is a plan view of the medial link of the end rails.

The carrier comprises a bed or frame A mounted at its ends by brackets B at the rear of the vehicle body as upon the members C which may either be portions of the vehicle frame or bumper bars, according to the construction of the vehicle upon which the luggage carrier is to be mounted.

The bed A is formed of folding end rails 10 connected by parallel spaced apart rods or bars 11 having their ends extended thru the end rails. In the example shown each end rail is formed of five hingedly connected links 12, 13, 14, 15 and 16, the links 12 being disposed at the outer end of the frame. These links 12 to 16 inclusive, together with the rods 11 form a series of hingedly connected frame sections held in alignment on a horizontal plane by the special formation of the links, when the frame is extended for use.

The rods 11 hingedly connecting the frame links are provided at their ends, outwardly of the links, with suitable nuts or stops 17 serving to prevent spreading of the end rails 10. The ends of the rods 11 if so desired, may merely be upset beyond the end rails to prevent spreading of the rails. Each of the links 12 to 16 inclusive is provided at each end with a circular opening 18 thru which the rods 11 extend for pivotally connecting the ends of adjacent links in contacting overlying relation. As will be observed in Figure 1, the links 12, 14 and 16 of each end rail align longitudinally, while the links 13 and 15 align longitudinally inwardly of the links 12, 14 and 16.

Referring now to the specific construction and formation of the frame links whereby the hingedly connected frame sections are held in alignment when the frame is extended, the links are preferably struck from a suitable gauge metal and are formed with engaging abutments acting to limit pivotal movement of the frame sections. The frame links are relatively flat and may be of any suitable length, and while in the example shown the frame links are all of an equal length, the length of the individual links may vary if so desired.

Referring particularly now to the outermost links 12, the same are preferably provided with a rounded outer end, while the inner end of the links are rounded into the upper edge of the link as at 19 and meet with a right angle into the lower edge of the link forming a straight end edge 20 below the pivotal axis of the link. These straight end edges 20 provide abutments at the inner ends of the links 12 for co-acting with the next adjacent links 13.

The links 13 for pivotal connection at their outer ends with the inner ends of the links 12 are each provided with rounded ends 21 and these links are arranged inwardly of the links 12. Pressed or struck outwardly from the upper edge of each link 13 is an offset 22 providing a stop lug or projection having a stop edge 23 at its outer end extending diagonally to the longitudinal axis of the link, and at its rear end having a stop edge 24 extending at a right angle to the longitudinal axis of the link. The diagonally extending stop edge 23 is arranged substantially midway the ends of the link and extends in an upward and rearward direction when the frame is in its extended position. Pressed or curled outwardly from the lower edge of the link is an offset 25 forming a stop edge 26 at the forward or outer end of the offset and a stop edge 27 at the inner or rear end of the offset. The stop edges 26 and 27 extend at a right angle to the longitudinal axis of the links with the stop edge 27 aligning directly beneath the stop edge 24, while the stop edge 26 extends to a position near the outer end of the link. The stop edges 24, 26 and 27 are spaced inwardly from the center of the openings 18 a distance equal to one-half the width of the links.

The links 14 forming the central connecting links of the end rails are pivotally connected at their outer ends to the inner ends of the links 13 and are arranged outwardly of the links 13 in longitudinal alignment with the links 12. Each link 14 has its end rounding into the upper straight edge of the link in an arc co-axial with the pivotal axis of the link, and meet with a right angle into the lower edge of the link providing straight end edges 28 and 28' at the front and rear ends respectively of the link.

The links 15 for pivotal connection at their outer ends with the inner ends of the links 14 are each provided along their upper edge with an outwardly curled or pressed offset 30 forming a stop lug or projection having stop edges 31 and 32 formed at its front and rear end respectively and extending at a right angle to the longitudinal axis of the link. Pressed or curled outwardly from the lower edge of each link 15 is an offset 30' having stop edges 31' and 32' at its front and rear end respectively aligning transversely of the link with the stop edges or shoulders 31 and 32. These stop edges or shoulders are also spaced from the axis of the openings 18 a distance equal to one-half the width of the links. The rear ends of the links 15 pivot on the rod 11' extending thru the outer end of the brackets B.

The two innermost rods designated at 11' may be termed fixed rods and are extended thru the upper ends of the brackets B. The links 16 are arranged inwardly of the upper ends of the brackets B and receive therethru the stationary rods 11'. The links 16 are arranged between the inner surfaces of the brackets B and the links 15 and each link 16 at its forward or outer end is formed with a straight end edge portion 34 at right angles to the longitudinal axis of the link and rounding off at its upper edge into the upper straight edge of the link. The straight end edge portion 34 is arranged below the axis of the opening 18. The straight end edge portion 34 forms an abutment for the rear end of the projection 30' of the link 15 when the frame is extended.

The links 13 and 15 of each end rail 10 may be termed the inner set of links since these links are arranged along the inside of the rails, while the links 12, 14 and 16 may be termed the outer set since they extend along the outer sides of the end rails.

The brackets B may be of any suitable shape at their lower ends for attachment to the rear portion of the vehicle frame as by suitable bolts or other fastening elements 35. The brackets B are each provided with an elongated vertically extending slot 36 aligning vertically with the outer fixed rod 11'.

These vertically elongated slots 36 receive shafts 37 supporting the inner ends of brace arms 38 having their outer ends pivoted to the ends of the rod pivotally connecting the links 13 and 14. These brace arms 38 are offset outwardly intermediate their ends as shown in Figure 1 for allowing the links to clear certain of the bolts or heads 17 when the frame is in its rolled position as shown in dotted lines in Figure 2. The rods or pivot pins 37 for the inner ends of the brace arms 38 have threaded ends for receiving wing nuts 40 which when tight against the brace arms hold the frame A in its extended flat position. The elements 37 may be bolts extended thru the brackets or a single rod may extend from end to end of the frame and have threaded ends for receiving the wing nuts 40. The brace arms 38 aside from stiffening and reinforcing the carrier frame when extended, also serve to retain the frame in its rolled condition above the brackets B.

The reason for having the slot 36 vertically elongated is to allow slight upward movement of the pins 37 to permit the frame to be rolled up.

Carried adjacent the outer end of each brace arm 38 is a thumb screw 45 which is intended to be threaded into opening 46 provided adjacent the outer end of the link 12 when the frame is rolled up. When the frame is rolled up and the thumb screws 45 threaded into the openings 46 the frame will be held in its rolled position.

The special construction of the links 12, 13, 14, 15 and 16 and their manner of co-acting with one another acts to hold the frame in a rigid flat position when extended and also limits the rolled condition of the frame. When the frame A is extended for supporting luggage or any other desired articles, the stop shoulder 26 of the link 13 engages the stop edge 20 of the link 12 for limiting downward swinging of the link 12 beyond a horizontal plane. The stop shoulder 27 engages the end edge 28 of the link 14 and limits downward swinging of the link 13. The stop shoulder 31' engages the straight end edge 28' and limits downward swinging of the link 14, while the stop shoulder 32' abuts with the straight end edge 34 at the outer end of the link 15 and limits downward swinging of the link 15. Thus the offsets 25 and 30' formed along the lower edges of the links 13 and 15 respectively co-act with the straight end edges of the links 12, 14 and 16 for holding the frame A in a flat horizontal position when extended.

When the frame is in its rolled up position as shown in dotted lines in Figure 2 the abutments 32 at the inner ends of the links 15 engage the straight upper edges of the links 16 and limit rearward swinging of the links 15 beyond a vertical position. The abutments 31 of the links 15 are engaged by the edges of the links 14 for limiting folding movement of the links 14 beyond a position parallel to the link 16 and at a right angle to the links 15. The outer links 12 fold into engagement with the diagonal abutments 23 so that the links 12 and 13 are in angular relation with the links 12 projecting between the brace arms 38 beneath the links 14. When the links 12 are extended between the brace arms 38 the threaded openings 46 of the links 12 receive the thumb screws 45.

When rolling the frame from an extended position as shown in Figure 2 the wing nuts 40 are first loosened and then by gripping the outermost rod 11 the frame sections are rolled upon one another, first swinging the outermost section until the links 12 engage the diagonal abutment 23 and then successively pivoting the frame sections until rolled in a position as in dotted lines in Figure 2. After the frame is completely rolled the thumb screws 45 may be threaded into the openings 46 for retaining the frame in its rolled position and then the wing nuts 40 tightened for holding the rolled frame in position above the brackets B.

Suitable strap loops 50 may be attached to the rearmost rod 11.

The inner set of links 13 and 15 co-act with the outer set of links 12, 14 and 16 in such manner as to form stop hinge joints between the frame sections for holding the frame in a rigid flat condition when extended and also limits rolling up of the frame sections so that the frame will have a neat appearance when not in use.

When placing small articles upon the carrier, desired portions of the frame may be turned upwardly, and when the two rearmost frame sections embodying the links 12 and 13 are swung upwardly, the abutments 24 on the link 13 will engage the straight upper edge of the links 14 and limit swinging movement of the link 13 beyond a vertical position.

From the foregoing it will be apparent that an improved construction for luggage carriers has been provided wherein the supporting frame is so constructed as to allow for the same to be rolled into a compact form when not desiring to use the carrier. It will also be apparent that, with a carrier so constructed as to be rolled into a compact form, the carrier will not conceal any appreciable part of the vehicle and therefore will not detract from the appearance of the vehicle.

Changes in detail may be made to the form of invention herein shown and described, without departing from the spirit of the invention or the scope of the following claims.

I claim:

1. A luggage carrier for vehicles comprising brackets for attachment to the vehicle, a bed frame supported at its inner edge between the brackets and embodying hingedly connected sections capable of being rolled upon one another above the brackets, a brace arm pivotally connected between each bracket and the adjacent end of the frame, and means carried by each brace arm for engagement with one of the frame sections for preventing unrolling of the frame.

2. A luggage carrier for vehicles comprising a pair of brackets for attachment to the vehicle, a frame supported at its inner edge between the brackets and embodying hinged sections allowing the frame to be rolled into compact form above the brackets, coacting stop means between the frame sections holding the frame sections in a like plane when the frame is extended, stop means for limiting rolling up of the frame sections, brace arms pivotally connected between the brackets and the ends of the frame, and a thumb screw carried by each brace arm for threaded connection with the outermost frame section when the frame is rolled up for retaining the frame in its rolled condition.

3. In a luggage carrier for vehicles the combination of a pair of supporting brackets for attachment to the vehicle, a frame supported at its inner edge between the brackets embodying hingedly connected sections pivoted to swing upwardly, a brace arm pivotally connected at one end to one end of the frame upon the hinge joints for a pair of adjacent frame sections, and a clamping bolt connecting the inner ends of the brace arms to the brackets and each having sliding movement in a vertically elongated slot in the brackets.

4. In a luggage carrier, a roll-up bed frame embodying end rails comprising inner and outer sets of links, means pivotally connecting the ends of the links in overlying relation, and offsets provided on the outer side of the inner links for abutting with the ends of the outer links below the pivotal axis of the links when the frame is extended for use.

5. In a luggage carrier, a roll-up bed frame embodying end rails comprising inner and outer sets of links, means pivotally connecting the ends of the links in overlying relation, offsets provided on the outer side and at the lower edge of the inner links for abutting with the ends of the outer links below the pivotal axis of the links when the frame is extended for use, and offsets provided on the outer side and at the upper edge of the inner links for abutting with one edge of an adjacent link to limit angular movement of the links when the frame is rolled up.

6. In a roll-up bed frame for luggage carriers, end rails each embodying a set of inner links and a companion set of outer links, rods connecting the end rails and pivotally connecting the ends of the links in overlying relation, offsets pressed outwardly along the lower edge of the inner links and forming a shoulder at each end of the offset for abutting with the ends of adjacent outer links when the frame is extended for use with the sets of links in longitudinal alignment, and offsets pressed outwardly along the upper edge of the inner links and forming a shoulder at each end of the offset for abutting with one edge of an adjacent outer link for limiting angular movement of the links when the frame is rolled up.

GERALD L. BINNS.